United States Patent [19]
Gebhart et al.

[11] Patent Number: 4,457,603
[45] Date of Patent: Jul. 3, 1984

[54] 360° VIEW CAMERA

[75] Inventors: John R. Gebhart, Enfield, Conn.; Francis X. Ledoux, Springfield, Mass.

[73] Assignee: United Technologies Corporation, Hartford, Conn.

[21] Appl. No.: 411,949

[22] Filed: Aug. 26, 1982

[51] Int. Cl.$^3$ .............................................. G03B 37/00
[52] U.S. Cl. ....................................... 354/80; 354/63; 354/98; 374/162
[58] Field of Search ...................... 354/63, 77, 80, 94, 354/96, 98; 73/104, 105; 374/137, 162; 116/207

[56] References Cited

U.S. PATENT DOCUMENTS

| | | | |
|---|---|---|---|
| 2,737,864 | 3/1956 | Gutterman et al. | 354/63 |
| 2,894,436 | 7/1959 | Eber et al. | 354/63 |
| 2,986,980 | 6/1961 | Morris | 354/96 |
| 3,099,946 | 8/1963 | Burton et al. | 354/99 |
| 3,185,057 | 5/1965 | Hearon et al. | 354/96 |
| 3,191,182 | 6/1965 | Caldwell et al. | 354/96 |
| 3,244,085 | 4/1966 | Pulfer | 354/63 |
| 3,651,695 | 3/1972 | Brown | 116/207 |
| 4,215,275 | 7/1980 | Wickersheim | 374/137 |

Primary Examiner—A. A. Mathews
Attorney, Agent, or Firm—Norman Friedland

[57] ABSTRACT

A 360° view camera for photographing the surface of a cylindrical or conical surface includes a magazine housing sheet film wound on a rotating cylinder exposed to a fixed lens through a fixed slit aligned with a specimen to be photographed where the specimen is rotated in a predetermined relationship with the rotation of the film. In another embodiment a fiber optic bundle transmits the view from a fixed mirror to the lens. In each of these embodiments means are provided for minimizing the distortions in the negative so that the film can be utilized for an automated temperature paint analysis by digitizing the film and processing the information through a computer to calculate the temperature profile of the cylinder after being subjected to a heat environment.

4 Claims, 3 Drawing Figures

360° VIEW CAMERA

CROSS REFERENCE

This patent application relates to the photographing equipment for taking 360° views of the inside of a cylinder or cone disclosed in a patent application entitled 360° View Camera filed by the same inventors on even date and assigned to the same assignee as this patent application.

DESCRIPTION

1. Technical Field

This invention relates to cameras for taking 360° view pictures and more particularly for taking pictures of a cylindrical or conical surface so that the picture conforms to a developed view of the surface photographed.

2. Background Art

Often times it is desirable to show a developed view of a curved surface wherein the negative is relatively free from aberration due to complex angles and from an uneven intensity due to varying lighting of the surface being filmed. Historically, the industry has witnessed a number of cameras for taking panoramic views and particularly of the slit type. A problem that has been prevalent in the industry is the vertical lines that result from uneven movement of the film. In the intended use of the film to which this invention is addressed such "banding" is unacceptable. The film should not only be free from "banding" but should have minimum distortions due to improper focusing, uneven lighting and varying color intensity due to the angle being focused.

We have found that mounting the flat stock film on a cylinder in an enclosed magazine and rotating this film and exposing the film to the object through a fixed slit oriented in line with a suitable lens and rotating the part being photographed in synchronous movement produces a uniform negative that is relatively free from distortions. The intended use of this film is automatic temperature indicating paint analysis utilizing digitizing and computing techniques.

This invention contemplates utilizing a fiber optic bundle for transmitting the image of the curved surface to the remotely located camera. In this embodiment, the viewer of the system is movably disposed in a given position relative to the inner and outer liner walls intended to be photographed. Hence, the camera is capable of taking in situ pictures of the assembled annularly shaped burner can of a jet engine. Similarly to the system described above the can is rotated about the viewer and the viewer is discretely positioned to photograph the entire length of both the inner and outer surfaces forming the annular passageway in the liner.

DISCLOSURE OF INVENTION

An object of this invention is to provide camera means for taking 360° developed view of a cylindrical or conically shaped surface and characterized by minimizing aberrations, distortions and uneven light intensities. A feature of this invention is to synchronize the rotational speed of the film and object being photographed.

Another feature of this invention is to utilize a fiber optic bundle for transmitting the image to the negative and for providing a fixture for photographing in situ the cylindrical surfaces defining the annular combustion chamber of a gas turbine engine. Another feature is to provide independent adjustment means for the fiber optic, the lens and the reflector utilized in this system.

Other features and advantages will be apparent from the specification and claims and from the accompanying drawings which illustrate an embodiment of the invention.

BEST MODE FOR CARRYING OUT THE INVENTION

Figure 1:
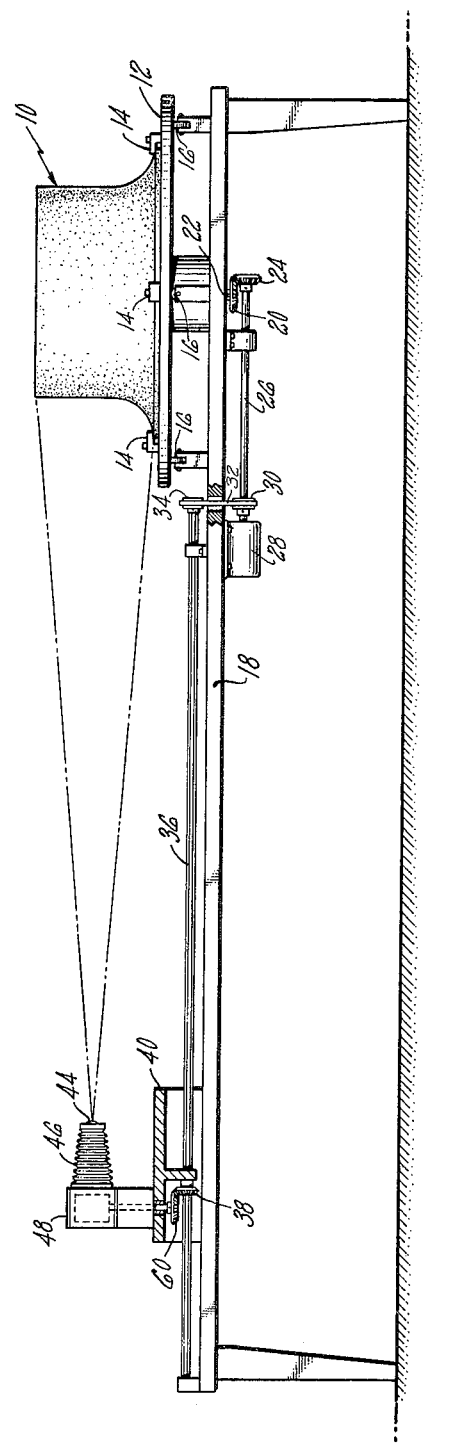
FIG. 1 is a schematic illustration of the camera mounted in position for photographing the test specimen also mounted into position.

While this invention is shown as being utilized for photographing burner cans for a gas turbine, it is to be understood that the invention can be utilized for photographing other objects where a 360° view is desired. In this embodiment as shown in FIG. 1, the test specimen, which is a burner can 10, is mounted on a turntable 12 and clamped in position by suitable clamps 14. The turntable is supported by suitable rollers 16 which in turn is supported to the table 18. The turntable is driven by the bevel gear 20 secured to the turntable shaft 22 which in turn mates with drive bevel gear 24 driven through shaft 26 by the suitable variable electric motor 28.

The shaft 26 also carries the sprocket gear 30 which through chain 32 drives the sprocket gear 34. Gear 34 is suitably attached to the hex-shaped shaft 36 which drives bevel gear 38. While a hex-shaped shaft is shown, any mechanism that will allow translation of the carriage 40 and rotates is equally suitable. As is apparent from the foregoing, bellows 46 is able to adjust rectilinear for adjusting the focal point of the lens relative to the specimen being photographed and carriage 40 adjusts rectilinearly to attain the proper magnification in the vertical expanse of the can so as to remove any distortion in the image i.e. as to say, for example, the holes in the can will photograph substantially round. The lens 44 is mounted at the front end of bellows 46 which affixes to the removable film magazine 48. Any suitable lens can be utilized and in this instance a 135 mm is preferred.

Figure 2:
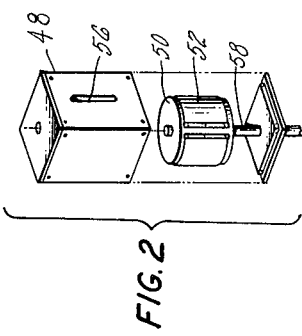
FIG. 2 is an exploded view schematically illustrating the film magazine.

As noted in FIG. 2, the magazine 48 houses a rotatable cylinder 50 that has mounted thereon a flat sheet of film 52 retained in position by suitable retention means not shown. The preferred size of the film is standard four inch by ten inch so that the processing can use the commercially available equipment. For photographing burners treated with temperature indicating paint, the preferred film is Varicolor II Professional Type (L) balanced for 3200° F. tungsten illumination and the development process preferably utilizes Flexicolor C-41. (These items are commercially available.)

Although not shown, the magazine would carry a suitable slide to protect the film from exposure to light through slit 56 and the magazine is removable from the bellows. In operation a ground glass is mounted in the place of the removed magazine and bellows 46 and carriage 40 are moved until the image of the surface being photographed is properly focused and is free of distortions. Obviously, the ground glass is removed and the magazine is inserted in place. Shaft 58 engages bevel gear 60 which in turn is driven by the mating bevel gear 38. Hence, activating motor 28 causes both the can 10 and film cylinder 50 to rotate a complete revolution. (The slide being removed so that the film is exposed to the lens for photographing the entire 360° surface of the exterior of can 10.) The negative provides an image of the developed view of the cylindrical surfaces of the can.

A tested specimen (can 10) treated with temperature indicating paint photographed in this manner can be utilized in automated analysis. By minimizing distortions, aberrations and varying intensities of light and placing the 360° view on a flat surface, the negative can then be digitized in a wll known manner and the digitized information can be transformed into the temperature values sensed from the color and intensity of the photographed burner can. By inserting a calibration strip with known temperature values into the field of view during photographing, variables, such as lighting, exposure and film processing can be corrected during the process of translating paint color and brightness to temperature values.

Figure 3:
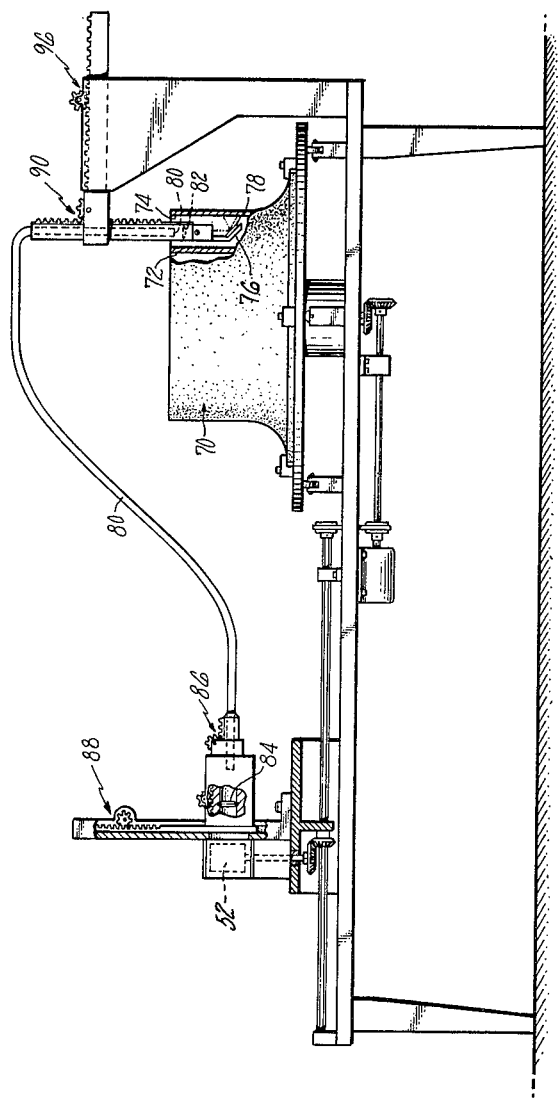
FIG. 3 is another embodiment exemplifying this invention where a fiber optic bundle is ulilized to transmit the image from the mirror reflector to the camera.

FIG. 3 is a modified version of FIG. 1 and illustrates the camera for photographing the interior walls of the annular combustor 70. Combustor 70 illustrates a typical annular type combustor, say the type used on the JT9D engine manufactured by Pratt & Whitney Aircraft, a division of United Technologies Corporation, the assignee of this patent application, and comprises an inner and outer annular wall 72 and 74 defining an annular passageway where combustion ensues. The viewer portion of the camera comprises a mirror holding fixture 76 that holds the mirror 78 at a 45° angle for transferring the image of the curved surface to the end of the fiber optic bundle 80 through the suitable lens 82. The fixture 76 carries a light source (not shown) to illuminate the surface being photographed so that the fiber optic bundle transmits the image to the lens 84. The opposite end of the bundle is exposed to the lens 84 which focuses on the film 52 (see FIG. 2). A suitable fiber optic bundle is commercially available and is of the coherent or image type.

It is apparent from FIG. 3 that the mechanism for rotating the film and the specimen being photographed is identical to the mechanism described in FIG. 1 and for the sake of clarity and simplicity a description is omitted herefrom. To achieve a suitable negative, unlike the structure shown in FIG. 1, the end of the fiber optic bundle 80 relative to the lens 84 is adjustable by a suitable rack and pinion adjustment generally illustrated by reference numeral 86 for removing vertical distortion and lens 84 is adjusted to focus the image.

The mirror 78 is adjusted axially by rack and pinion adjustment 90 for taking the image along the axial length of the burner and the lens 84 is moved axially (upwardly) by rack and pinion 88 relative to the film for placing the axial extent of the burner surface side by side along the film negative. When the mirror has completely transversed the surface from bottom to top (or vice versa) the fixture 76 is removed from the annular passageway and rotated 180° to photograph the opposite surface, i.e. the inner surface of cylinder 72. The lens 84 is moved upwardly for every 360° segment being photographed until the entire surface is photographed or no additional space remains on the negative. Of course, care must be taken so that the image photographed is properly indexed on the film.

The fixture 76 and associated fiber optic bundle 80 may be positioned rectilinearily by the rack and pinion assembly 96 so as to accommodate different diameter burner cans.

It should be understood that the invention is not limited to the particular embodiments shown and described herein, but that various changes and modifications may be made without departing from the spirit and scope of this novel concept as defined by the following claims.

We claim:

1. A camera and fixture for photographing a cylindrical or conical surface of a test speciment to obtain a developed 360° view thereof including frame means for supporting the camera and the specimen in aligned relationship, said camera including a lens, a magazine for housing film, a cylinder for receiving said film and holding said film in a cylindrical position disposed in aligned relationship with said lens, a slit in said magazine exposing said film in view of said specimen, and means for synchronously rotating said cylinder and said specimen a revolution relative to said slit for exposing said film a substantially complete revolution when said specimen attains a complete revolution.

2. A camera as claimed in claim 1 wherein said magazine is a detachable film magazine, said camera includes a bellows intermediate said lens and said magazine for adjusting the focal point of the image of said specimen and means on said fixture for positioning said lens and film magazine in unison relative to said specimen.

3. A camera as claimed in claim 2 including a variable electric motor and connection means interconnecting said specimen and said cylinder and said motor for synchronous movement relative to each other.

4. A camera as in claim 1 where the specimen includes a pair of spaced concentric walls defining an annular passage, a mirror for reflecting the surface of said walls defining said annular passage, an additional fixture supporting said mirror in fixed relationship relative to said specimen, a coherent fiber optic bundle interconnecting said mirror and said lens, means for independently positioning said mirror relative to said walls, and means for adjusting the end of said fiber optic bundle relative to said lens and an additional lens disposed intermediate said mirror and the opposite end of said fiber optic bundle for transmitting the surface of said cylinder to said film as both said film and said specimen rotate.

* * * * *